United States Patent [19]
Dell et al.

[11] 4,251,560
[45] Feb. 17, 1981

[54] CREAM-CONTAINING FROZEN WHIPPED TOPPING COMPOSITION

[75] Inventors: William J. Dell, Fishkill; William E. Flango, Jr., Hopewell Junction; William H. Povall, Fishkill, all of N.Y.; Lawrence H. Freed, Clifton, N.J.; Susan D. Fencl, Weston, Conn.

[73] Assignee: General Foods Corporation, White Plains, N.Y.

[21] Appl. No.: 68,360

[22] Filed: Aug. 21, 1979

[51] Int. Cl.³ .............................................. A23C 13/12
[52] U.S. Cl. .................................... 426/565; 426/567; 426/570
[58] Field of Search ................ 426/567, 570, 578, 565

[56] References Cited

U.S. PATENT DOCUMENTS

| | | | |
|---|---|---|---|
| 2,970,918 | 2/1961 | Peterson | 426/659 |
| 3,224,883 | 12/1965 | Pader et al. | 426/116 |
| 3,431,117 | 3/1969 | Diamond | 426/565 |
| 3,434,848 | 3/1969 | Katz | 426/554 |
| 3,628,968 | 12/1971 | Noznick et al. | 426/570 |
| 3,656,972 | 4/1972 | Blomberg | 426/570 |
| 3,764,346 | 10/1973 | Noznick et al. | 426/213 |
| 3,944,680 | 3/1976 | Van Pelt et al. | 426/570 |
| 3,956,519 | 5/1976 | Evans et al. | 426/570 |
| 3,968,267 | 7/1976 | Ogasa et al. | 426/570 |

*Primary Examiner*—Jeanette M. Hunter
*Attorney, Agent, or Firm*—Mitchell D. Bittman

[57] ABSTRACT

A process is provided for preparing a frozen whipped topping composition containing milk fat, which upon thawing, has an extended refrigerator shelf life while maintaining its volume, texture and eating properties. The process involves blending milk fat, emulsifier, stabilizer, carbohydrate and water with a cross-linked and hydroxypropylated starch, followed by pasteurizing, homogenizing, cooling, whipping and freezing the composition.

17 Claims, No Drawings

CREAM-CONTAINING FROZEN WHIPPED TOPPING COMPOSITION

BACKGROUND OF THE INVENTION

This invention relates to a process for preparing frozen whipped topping compositions. More particularly, it relates to a process for preparing frozen whipped topping compositions containing real cream and which have extended refrigerator shelf life after thawing. This composition is suitable for use as a whipped cream substitute and as a topping for desserts, icing for cakes and the like. Frozen whipped toppings based upon milk fat (i.e., containing real cream) have previously had a very short shelf life or poor eating qualities after thawing. These prior art samples became loose, soupy (soft, no resilience), open textured (grainy, webby) and exuded free liquid within hours after thawing in the refrigerator. Freeze-thaw stability could previously only be obtained by giving the product a heavy, thick mouthfeel, uncharacteristic of freshly whipped cream and even then the refrigerator stability was limited (i.e. 2 to 3 days). The present invention extends the refrigerator shelf life of the topping based upon milk fat for a period up to as much as 5 to 7 days or longer while maintaining the mouthfeel, texture and appearance characteristic of freshly whipped cream and represents a significant advance over that which had been available in the art.

The prior art reveals many attempts at stabilizing whipped toppings by use of stabilizers such as starches, emulsifiers, or gums, but many of these systems are directed to dry mixes or concentrates and not to frozen whipped toppings based upon milk fat, much less a topping with extended refrigerator shelf life and improved mouthfeel, texture and appearance characteristics after thawing. U.S. Pat. No. 3,431,117 by Lorant does prepare a stable frozen whipped topping, however, the specific problem of stabilizing a milk fat system is not dealt with nor is the specific stabilizer critical to the present invention disclosed.

Therefore, it is a feature of the present invention to provide an improved frozen whipped topping composition.

A further feature of the present invention is to provide a process for preparing a frozen whipped topping composition based upon milk fat, which composition has extended refrigerator shelf life after thawing.

A still further feature of the present invention is to provide a whipped topping composition which upon thawing, has the attributes of freshly prepared whipped cream.

SUMMARY OF THE INVENTION

Briefly, the instant invention provides a process for preparing a frozen whipped topping based upon milk fat and having improved stability upon thawing and refrigerator storage comprising blending milk fat, emulsifiers, stabilizers, carbohydrate, water and a modified starch, pasteurizing and homogenizing these ingredients to form an emulsion, cooling the emulsion, whipping the emulsion, and then freezing the emulsion. The modified starch employed is a cross-linked and hydroxypropylated starch. The frozen whipped topping so prepared upon thawing is characterized by its excellent volume, texture and eating properties, the superior storage stability after thawing, as well as the convenience offered to the consumer.

DETAILED DESCRIPTION OF THE INVENTION

The process of the present invention makes it possible to prepare a frozen whipped topping composition containing real cream which may be distributed and sold in a frozen state and which upon thawing retains its excellent volume, smooth, continuous, light and fluffy texture, and eating properties for an extended period of time. The thawed composition may be stored at refrigeration temperatures for a period of about 5 to 7 days or longer without an apparent loss in volume, texture and eating properties. Thus, the composition may be described as having exceptional freeze-thaw stability as well as extended stability upon thawing at refrigerated temperatures.

The unique and surprising characteristic of the present invention is the ability to employ real cream, i.e. milk fat, in the preparation of a frozen whipped topping which is stable upon thawing. The fat employed is a milk fat, such as that derived from real cream, butter fat, anhydrous milk fat or other milk fat sources. By the use of milk fat, the resultant topping imparts a fast meltdown in the mouth, thus providing a mouthfeel close to freshly prepared whipped cream.

Critical to stabilizing milk fat in the frozen whipped topping of the present invention is employing a modified starch to stabilize the emulsion and provide the freeze-thaw capabilities while withstanding homogenization and high temperatures during processing of the topping. The specified modified starch is critical in that other starches or gums have not been found to impart the requisite freeze-thaw and refrigerator shelf life stability or impart the desired volume, texture and eating qualities to the frozen whipped topping composition. The starch is modified by cross-linking and hydroxypropylation with a cross-linked and hydroxypropylated tapioca starch providing the optimum stability and characteristics upon thawing the frozen whipped topping although other cross-linked and hydroxypropylated starches, such as waxy maize starch, are also suitable.

The starch is hydroxypropylated, e.g. with propylene oxide, to preferably a level of at least about 0.2% with a preferred upper limit of 6%, by weight of hydroxypropyl groups by weight of the starch. The degree of hydroxypropylation is determined by standard analytic techniques such as that described by Stahl and McNaught, in Cereal Chemistry (Vol 47, No. 4, 1970, 345–350). The degree a starch is cross-linked is standardly determined by reference to the viscosity characteristics of the modified starch over time and temperature, i.e. by viscometric analysis using an instrument such as the Brabender Viscoamylograph (C.W. Brabender Instruments Inc., South Hackensach, N.J.). Analysis with the Brabender Viscoamylograph is widely used in the starch industry as is discussed in the following literature: Starch Production Technology by J. A. Radley, (Applied Science Pub., Ltd, 1976); The Chemistry of Wheat Starch and Gluten by J. W. Knight (Leonard Hill, 1965, pages 135–137); and American Association of Cereal Chemists (approved methods of the AACC, Method No. 22-10). As measured on a Brabender Viscoamylograph the cross-linked and hydroxypropylated starch of the instant invention should have a viscosity of about 80 to 500 units at 95° C. and after 10 minute hold at 95° C. the increase in viscosity should be within the range of about 0–100 units. Preferably, the cross-linked and hydroxypropylated starch has a viscosity of about 150 to 350 Brabender Units at 95° C. The following conditions were employed in the analysis of the starch with the Brabender Viscoamylgraph: 700 CM GMS cartridge; 75 r.p.m.; 30 grams starch (dry basis) in a total charge weight of 500 grams; initial temperature of 30° C. with a heating rate increase of 1.5° C. per minute; and maximum temperature of 95° C. with a hold at that temperature for 10 minutes.

The cross-linked and hydroxypropylated starch may be prepared by, for example, suspending 2 kilograms of tapioca starch in 3 liters of water containing 750 grams of sodium sulfate adjusted to a pH of 11. Propylene oxide (hydroxypropylation agent) at a level of 400 ml was added and the suspension stirred at room temperature for 20 hours. Phosphorous oxychloride (cross-linking agent) at a level of 0.024 ml was then added and the suspension stirred for an additional two hours. The modified starch was then filtered, washed thoroughly with water and air dried to 10% moisture. The resultant modified starch had a hydroxypropyl content of 0.4% and as measured on a Brabender Viscoaymlograph had a viscosity of 180 units at 95° C. and a 60 unit increase during the 10 minute hold at 95° C. The modified tapioca starch is preferably employed in the frozen whipped topping of the present invention at a level of 0.05 to 1.0% by weight of the composition, and optimally at levels within the range of about 0.25 to 0.5% by weight of the composition.

A wide variety of emulsifiers may be employed in the compositions which are prepared by the process of this invention. Thus, the following emulsufiers may all be used: hydroxylated lecithin; mono- or di-glycerides of fatty acids such as monostearin and dipalmitin; polyoxyalkylene ethers of fatty esters of polyhydric alcohols such as the polyoxyethylene ethers or sorbitan monostearate or the polyoxyethylene ethers of sorbitan distearate; fatty esters of polyhydric alcohols, such as sorbitan monosteareate; mono- and di-esters of glycols and fatty acids such as propylene glycol monostearate and propylene glycol monopalmitate; and partial esters of carboxylic acids such as lactic, citric and tartaric acids with the mono- and di-glycerides of fatty acids such as glyceryl lactopalmitate and glyceryl lactooleate. The fatty acids employed in the preparation of the emulsifiers include those derived from beef tallow, coconut, cotton-seed, palm, peanut, soybean, marine oils etc. The preferred emulsifiers employed in the composition of the present invention to impart optimum stability, appearance and textural attributes are polyglycerol esters (e.g. hexaglycerol di-stearate) and tartaric acid esters, generally at levels ranging from 0.1 to 0.3% by weight of the composition. Preferably, a combination of emulsifiers is employed, typically polyoxyethylene sorbitan monostearate (Polysorbate 60) and sorbitan monostearate.

A stabilizer is also desirably included in the frozen whipped topping composition. Such stabilizer is preferably a natural, i.e. vegetable, or synthetic gum and may be, for example, carrageenan, guar gum, alginate, xanthan gum, and the like or carboxymethylcellulose, methylcellulose and the like, and mixtures thereof.

A carbohydrate is employed in the frozen whipped topping composition to provide bulk and the desired sweetness. Thus, sugars such as sucrose, dextrose, fructose, lactose, maltose, invert sugars and mixtures thereof may be utilized as well as dextrins and low calorie sweeteners such as L-aspartic acid derivatives and saccharin.

Other ingredients which may be included in the frozen whipped topping compositions prepared by the process of this invention are flavoring agents, colorants or dyes, vitamins, minerals, and the like. Suitable flavoring agents include vanilla, chocolate, coffee, maple, spice, mint, caramel, fruit flavors and flavor intensifiers (e.g. salt).

The amounts of milk fat, emulsifier, stabilizer, carbohydrate, and optionally included ingredients as well as the amount of water employed in the preparation of frozen whipped topping compositions according to the process of this invention can be varied over relatively wide limits. When homogenization of the composition using a pressure of at least 6000 p.s.i. (420 kg/cm$^2$) is employed, this allows considerable latitude in the amounts of the various ingredients. The amount of milk fat will be sufficient to provide a stable whipped topping which has good mouthfeel and yet, upon melting, does not leave an undesirable film on the palate. Sufficient amounts of modified starch, emulsifier, and stabilizer will be used to impart stability to the topping and to impart good whipping properties to the composition. Further, the amount of carbohydrate will be varied over a range sufficient to provide desired bulk and sweetness level in the finished topping composition. A preferred range of ingredients is as follows:

| Ingredients | Percent by weight |
| --- | --- |
| Milk Fat (solids basis) | 15.0–30.0 |
| Modified Tapioca Starch | 0.2–1.0 |
| Emulsifier | 0.2–2.0 |
| Stabilizer (gum) | 0.02–2.0 |
| Water | 35.0–65.0 |
| Carbohydrate (sugar) | 15.0–35.0 |
| Flavoring Agent | 0.2–2.0 |
| Colorant | 0.01–0.05 |

The ingredients are blended in suitably desirable ratios to form a mix. The mix may then be heat pasteurized, i.e. subject to a sufficiently high temperature for a period of time effective to solubilize and disperse the ingredients of the mix, gelatinize the starch and kill all pathogens, e.g. at a temperature of about 155° F. (70° C.) to 165° F. (75° C.), for about 30 minutes, or similar time-temperature relationships (e.g. high-temperature short time). The mix is then passed through a homogenizer of the typical dairy type. Although homogenization may be accomplished in one stage, for best results, homogenization is carried out in two stages, operated with the pressure maintained during the first stage preferrably at a minimum of 6000 p.s.i. (420 Kg/cm$^2$) and a maximum of about 10,000 p.s.i. (700 Kg/cm$^2$), preferably about 7500 p.s.i. (525 Kg/cm$^2$), and the second stage at a pressure of at least about 500 p.s.i. (35 Kg/cm$^2$). The mix temperature is usually maintained at a temperature of about 155° F. (70° C.) to 180° F. (80° C.) during homogenization. The emulsion is then cooled, e.g. to about 27° F. (−3° C.) to 45° F. (7° C.) and may be held at this temperature for a period of time sufficient to allow fat crystallization. The emulsion is then passed through a whipper for the incorporation of air or an inert gas such as nitrogen, carbon dioxide, nitrous oxide or the like. The whipper may be of conventional construction such as a Votator Continuous Recirculating Mixer (Trademark). The emulsion is whipped and aerated to above 200% overrun, preferably above about 250% overrun, packaged and frozen.

The process of the present invention thus produces a real cream frozen whipped topping composition which is stable and remains smooth after several freeze-thaw cycles. The frozen topping composition upon thawing has a prolonged refrigeration shelf life, while possessing the light, fluffy, smooth and continuous texture, mouth-feel, appearance, volume and eating quality characteristic of freshly prepared whipped cream. To use the frozen whipped topping composition, the product is defrosted, for example, by being left for 3½ hours (for a 4.5 ounce or 125 gram container) in the refrigerator. The composition after thawing is thus ready for immediate table use without the necessity of reconstitution or whipping.

In order to illustrate the present invention, but in no matter to restrict it, the following example is given

EXAMPLE

The frozen topping composition was prepared containing the following ingredients:

|  | Percent by Weight |
|---|---|
| Heavy Cream (40% fat) | 62.5 |
| Sugar | 20.5 |
| Water | 14.4 |
| Dextrose | 1.2 |
| Crosslinked and Hydroxypropylated Tapioca Starch | .5 |
| Polysorbate 60 | .3 |
| Sorbitan Monostearate | .2 |
| Flavor | .2 |
| Xanthan Gum | .1 |
| Guar Gum | .1 |
|  | 100.0% |

The tapioca starch had a hydroxypropyl content of 0.4% and at 95° C. a viscosity of 180 units and a 60 unit increase during the 10 minute hold at 95° C., as measured on a Brabender Viscoamylograph having a 700 CM GMS cartridge, operated at 75 r.p.m., with 30 grams of dry starch in a total charge weight of 500 grams. The ingredients were mixed together and then pasteurized at 160° F. (70° C.) for 30 minutes. The pasteurized mix is then homogenized in two stages to form the emulsion. The first stage homogenization employing pressures of about 7200 p.s.i (500 Kg/cm$^2$) and the second stage employing pressures of 800 p.s.i. (55 Kg/cm$^2$). The homogenized mix is then cooled for 20 minutes at a temperature of 32° F. (0° C.) to 36° F. (2° C.) to allow fat crystallization. The cooled mix is then whipped and aerated in a Votator C. R. Mixer (Trademark) to above 200% overrun. The whipped mix is then packaged and frozen.

The composition so prepared is characterized by its excellent freeze-thaw stability even after several freeze-thaw cycles. After thawing and storage at refrigerator temperatures (about 40° F., 5° C.) for 5 days and longer the texture remained light, fluffy, continuous and smooth and did not become loose, soupy (no resilience), open textured (grainy, webby), or exude free liquid. Over the five days of refrigeration storage the thawed topping composition maintained a mouthfeel, texture, volume, appearance and eating quality characteristic of freshly prepared whipped cream.

What is claimed is:

1. Process for preparing a frozen whipped topping composition containing milk fat and having extended stability upon thawing and refrigerated storage by retaining its volume and smooth, continuous and fluffy texture comprising:

(a) blending into a mix 15 to 30% by weight of a milk fat, 15 to 35% by weight of a carbohydrate, 0.2 to 2.0% by weight of an emulsifier, 0.02 to 0.2% by weight of a stabilizer, 35 to 65% by weight of a water and an amount of a crosslinked and hydroxypropylated starch effective to impart extended refrigerated storage stability;
   (b) solubilizing and dispersing the mix by subjecting the mix to heat;
   (c) homogenizing said mix at pressures of at least 6,000 p.s.i. to form an emulsion;
   (d) cooling said emulsion to a temperature and for a period of time effective to allow the fat to crystallize;
   (e) whipping and aerating said cooled emulsion to an overrun of at least 200% by volume; and
   (f) freezing said whipped emulsion.

2. Process of claim 1 wherein the starch has a hydroxypropyl content of at least about 0.2% by weight of hydroxypropyl groups by weight of the starch.

3. Process of claims 1 or 2 wherein the cross-linked and hydroxypropylated starch has a viscosity within the range of about 80 to 500 units at 95° C. and after a 10 minute hold at 95° C. the increase in the viscosity is within the range of about 0–100 units, as measured on a Brabender Viscoamylograph having a 700 CM GMS cartridge, operated at 75 r.p.m., with 30 grams of dry starch in a total charge weight of 500 grams.

4. Process of claim 3 wherein the starch has a viscosity of about 150 to 350 units at 95° C., as measured on a Brabender Viscoamylograph having a 700 CM GMS cartridge, operated at 75 r.p.m., with 30 grams of dry starch in a total charge weight of 500 grams.

5. Process of claim 3 wherein the starch is a tapioca starch.

6. Process of claim 2 wherein the starch has a hydroxypropyl content within the range of about 0.2% to 6% by weight of hydroxypropyl groups by weight of the starch.

7. Process of claim 5 wherein the tapioca starch is crosslinked with phosphorus oxychloride and hydroxypropylated with propylene oxide.

8. Process of claim 3 wherein the homogenized emulsion is subjected to a second stage homogenization at pressures of at least 500 p.s.i.

9. Process of claim 8 wherein the overrun is greater than 250%.

10. Process of claim 8 wherein the homogenized emulsion is cooled to a temperature within the range of 27° F. to 45° F.

11. Process of claim 10 wherein the mix is pasteurized by subjecting the mix to heat.

12. Process of claim 3 wherein the amount by weight of modified starch is within the range of about 0.05 to 1.0% by weight of the composition.

13. Process of claim 1 wherein the emulsifier is selected from the group consisting of polyglycerol esters, tartaric acid esters, fatty esters of polyhydric alcohols, polyoxyalkylene ethers of fatty esters of polyhydric alcohols, mono and di-glycerides and combinations thereof.

14. Process of claim 1 wherein the stabilizer is selected from the group consisting of carrageenan gum, guar gum, xanthan gum, alginate gum, methylcellulose and combinations thereof.

15. Process of claim 9 wherein the starch is a tapioca starch and the amount of weight of modified starch is within the range of about 0.25 to 0.5%.

16. Product prepared by the process of claims 1 or 15.

17. Product prepared by the process of claim 3.

* * * * *